W. D. HENDERSON.
PARTITION STUD CLAMP.
APPLICATION FILED APR. 20, 1915.
1,167,899.
Patented Jan. 11, 1916.
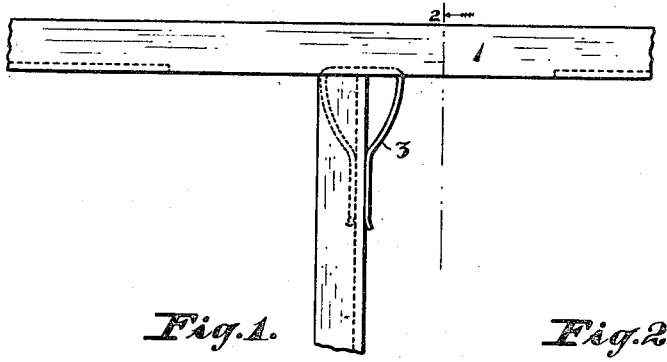
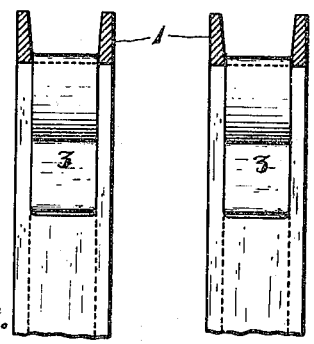
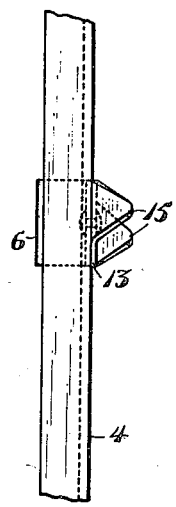
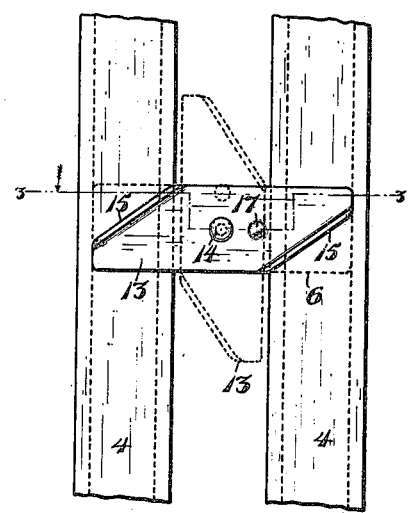
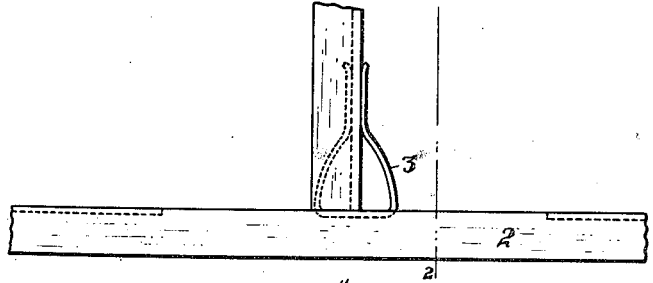
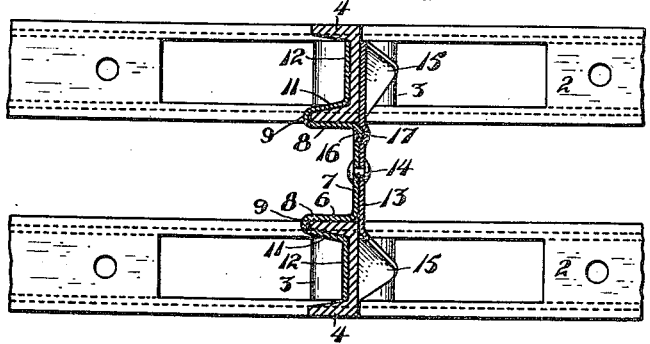
INVENTOR,
W. D. Henderson,
BY
Francis M. Wright,
ATTORNEY

UNITED STATES PATENT OFFICE.

WILBERT D. HENDERSON, OF SAN FRANCISCO, CALIFORNIA.

PARTITION-STUD CLAMP.

1,167,899.	Specification of Letters Patent.	Patented Jan. 11, 1916.

Application filed April 20, 1915. Serial No. 22,602.

*To all whom it may concern:*

Be it known that I, WILBERT D. HENDERSON, a citizen of the United States, residing at San Francisco, in the county of San Francisco and State of California, have invented new and useful Improvements in Partition-Stud Clamps, of which the following is a specification.

This invention relates to an improved clamp for clamping together the two channel-shaped stud members which form the studs to support lathing in partitions in buildings, and the object of the invention is to provide a clamp of this character which can be secured in place more expeditiously than heretofore.

In the accompanying drawing, Figure 1 is a broken side view of a portion of framing for a partition; Fig. 2 is a vertical cross section on the line 2—2 of Fig. 1; Fig. 3 is a horizontal cross section on the line 3—3 of Fig. 2.

Referring to the drawing, 1, 2 indicate upper and lower horizontal channel-irons forming respectively the top and bottom of framing for an interior partition, and having parts 3 cut therefrom and bent respectively downward and upward to form guides for the upper and lower ends of stud members 4, each made of channel-irons. These guides and the manner of connecting them to the stud members form no part of my present invention.

The stud members are connected, intermediate of their ends, at either one or two points, by clamps, and my invention relates to an improved form of clamp for so connecting them. Said clamp consists of a stationary member 6 of sheet metal having a central portion 7 adapted to extend between the two stud members, two portions 8 extending at right angles from said central portion adjacent to the inner sides of said stud members, bent portions 9 extending around the edges of the inner members of the channel-shaped stud members, portions 11 extending closely adjacent to the inner surfaces of said inner sides of the channel-irons or stud members, and portions 12 extending closely adjacent to the inner surfaces of the central portions of said channel-irons. The clamp also comprises a movable member 13 of sheet metal, pivoted, as shown at 14, centrally to the member 6, corners of which member 13 are bent obliquely in a plane at right angles to its plane so as to form finger pieces 15, by which the member 13 can be turned on its pivot. The member 6 has on its outer side a projection 16 adapted to engage a recess 17 on the inner side of the member 13 to hold the same in position.

To secure the clamp in place the member 13 is turned at right angles to the member 6 so that it will just pass between said stud members or channel-irons. The member 6 is then placed in position against the inner surface of said channel-irons, and the member 13 is then turned through a right angle so as to press upon the outer sides of said channel-irons. When the member 13 has been turned to a position exactly parallel with the member 6, the projection 16 will engage the recess 17 to hold the two sheets in said relative position, clamping the channel-irons between them by spring pressure.

The utility of this device is obvious, since it effects a great saving in labor, which is the principal source of expense in work of this character.

I claim:—

1. A clamp for uniting channel-shaped stud members comprising a stationary member adapted to engage the inner surfaces of said stud members to prevent it from turning on said members, and a member pivoted to said stationary member and having a plane inner surface whereby it can slide in contact with the outer sides of said stud members.

2. A clamp for uniting channel-shaped stud members comprising a stationary member adapted to engage the inner surfaces of said stud members to prevent it from turning on said members, and a member pivoted to said stationary member and having a plane inner surface whereby it can slide in contact with the outer sides of said stud members, said members having parts adapted to engage each other with spring pressure when they extend parallel with each other.

3. A clamp for uniting channel-shaped stud members comprising a stationary member adapted to engage the inner surfaces of said stud members to prevent it from turning on said members, and a member pivoted to said stationary member and having a plane inner surface whereby it can slide in contact with the outer sides of said stud members, said members having, the one a projection, and the other a recess to receive said projection to limit the turning movement of the latter sheet.

4. A clamp for uniting channel-shaped stud members comprising a stationary member adapted to engage the inner surfaces of said stud members to prevent it from turning on said members, and a member pivoted to said stationary member and having a plane inner surface whereby it can slide in contact with the outer sides of said stud members and also having a portion bent outwardly to form a finger piece.

In testimony whereof I have hereunto set my hand in the presence of two subscribing witnesses.

WILBERT D. HENDERSON.

Witnesses:
FRANCIS M. WRIGHT,
D. B. RICHARDS.